Figure 1:
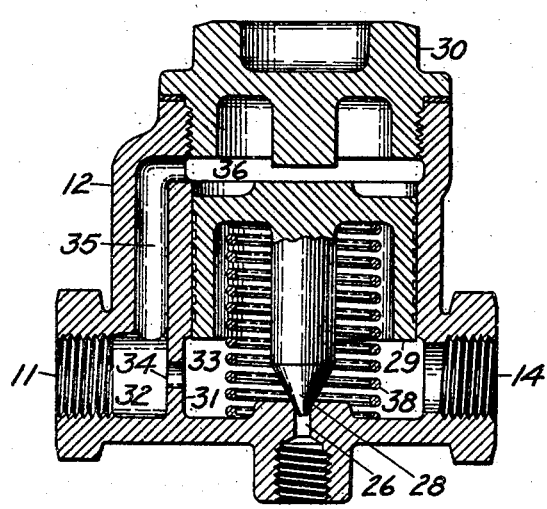

Nov. 14, 1933.                P. C. TEMPLE                1,934,758
                            AUTOMATIC VALVE
                            Filed May 14, 1930

WITNESS
A. G. Blodgett

INVENTOR
PAUL C. TEMPLE
BY
Clayton R. Jenks
ATTORNEY

Patented Nov. 14, 1933

1,934,758

UNITED STATES PATENT OFFICE 1,934,758

AUTOMATIC VALVE

Paul C. Temple, Decatur, Ill., assignor to A. W. Cash Company, Decatur, Ill., a corporation of Delaware Application May 14, 1930. Serial No. 452,435

10 Claims. (Cl. 137—153)

This invention relates to valves, and more particularly to an automatic valve construction arranged to control the distribution of a fluid in response to the rate of flow thereof.

Although the present invention is of practical value in connection with various other types of apparatus, it will be particularly described as arranged to control the liquid discharged by a positive displacement pump which is driven by a motor such as an electric motor or steam turbine. The rate of discharge of such a pump is directly proportional to its speed, except for slight variations due to change in fluid friction, pump slip, etc. Pumps of this type are frequently used to supply liquid under pressure to hydraulic cylinders having slidable pistons, which are required to move loads of varying resistance. Whenever the load increases, the liquid pressure likewise increases, and as a result the motor slows down. If the increase in load is too great, the electric motor will overheat and burn up.

It is accordingly one object of this invention to provide a construction which will serve to relieve the pressure in the discharge pipe of a positive displacement pump whenever the rate of flow through the pipe drops below a predetermined amount as a result of increase in load, and which will thereby prevent overloading of the driving means.

When the load on the pump is of a variable or intermittent character, momentary peak loads may stall and damage the motor regardless of the fact that the average load is well within the capacity of the motor. This has made necessary the use of larger and more expensive motors to ensure satisfactory operation at all loads.

It is therefore a further object of the invention to provide an automatic valve construction which will enable a motor driven pump to handle a greater peak load than it otherwise would, thereby permitting the use of a smaller motor.

In many installations a motor driven pump is required to start under load, so that the motor must overcome not only the inertia of the rotating parts during the acceleration period but also the pressure of the fluid. This situation calls for an expensive type of motor having a high starting torque, and in case of an electric motor a heavy current is drawn from the line until the pump is brought up to normal running speed.

A further object is therefore to provide a valve mechanism which will aid the starting of a motor driven pump by permitting it to reach substantially normal speed before applying the load thereto.

In case the supply of power for the motor suddenly fails while the pump is running under load, the fluid pressure will ordinarily stop the parts very suddenly, resulting in excessive shock strains on the coupling and other rotating parts.

It is accordingly a further object of the invention to provide a mechanism which will automatically relieve the pump discharge pressure as soon as a decrease in speed occurs and thus permit the motor to coast to a stop in the event of failure of the power supply.

With these and other objects in view, as will be apparent to those skilled in the art, my invention resides in the combination of parts set forth in the specification and covered by the claims appended hereto.

In accordance with my invention I provide a fluid pressure system including a pump which is preferably driven by a motor and arranged to deliver fluid for the actuation of a hydraulic mechanism. A by-pass valve is arranged to be automatically opened to relieve the discharge pressure of the pump whenever the rate of flow drops below a predetermined amount, whether this reduction in flow is the result of overloading, power supply failure, or any other cause. The valve is preferably actuated by a pressure responsive device, such as a piston biased to a given position, which is subjected to an effective pressure dependent upon the rate of flow. I preferably provide a restriction, such as an orifice, in the path of the fluid, and utilize the difference in pressure on the opposite sides thereof to control the pressure responsive device. This pressure difference decreases with the rate of flow, and whenever the predetermined minimum flow is reached, the piston moves in response to its bias and opens the by-pass valve.

Figure 2:
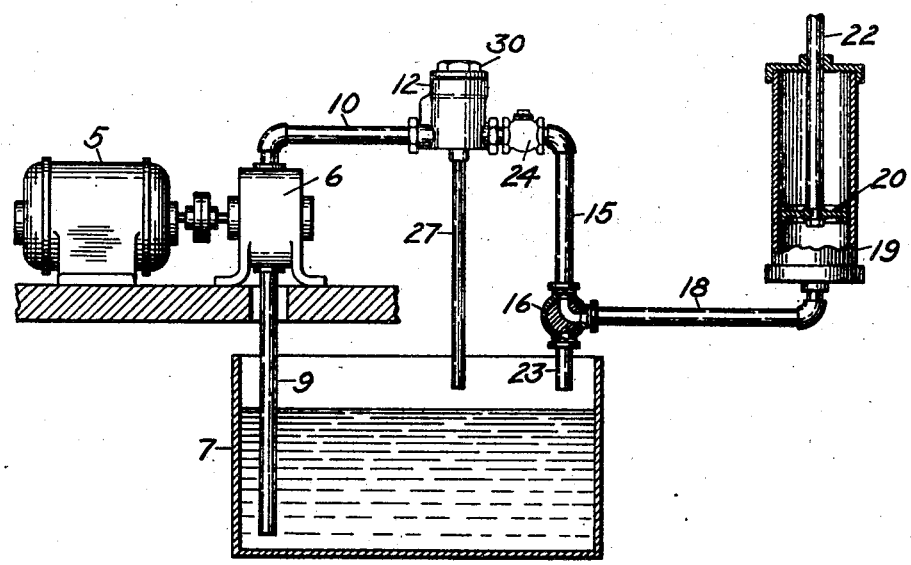

Referring to the drawing illustrating one embodiment of my invention, and in which like reference numerals indicate like parts, Fig. 1 is a cross section through the center of the automatic valve device, and Fig. 2 is an elevation on a reduced scale showing the device connected to other apparatus, certain parts being shown in section for clearness of illustration.

The embodiment illustrated in the drawing comprises an electric motor 5 directly connected to a rotary pump 6 of the positive displacement type. The pump is arranged to draw liquid, which may be oil, from a reservoir 7 through a suction pipe 9, and deliver it under pressure through a pipe 10. This pipe 10 is connected to the inlet opening 11 in the casing 12 of the automatic regulating device shown in detail in Fig. 1. The casing 12 is also provided with a discharge opening 14 which is connected by a pipe 15, three-way valve 16, and pipe 18 to a hydraulic cylinder 19. Slidably supported within the cylinder is a piston 20 having a piston rod 22, which may be connected to operate any desired apparatus, such as a hydraulic press (not shown). A pipe 23 leads from the three-way valve to the reservoir 7, and these parts are so arranged that when the valve 16 is in the position shown oil will flow from the pipe 15 through pipe 18 to the cylinder 19, thus raising the piston 20. If the valve 16 is turned through 90 degrees in a clockwise direction, the pipe 15 will be closed off entirely, and the oil in the cylinder 19 will be discharged through pipes 18 and 23 into the reservoir 7, thus lowering the piston 20. A check valve 24 is preferably mounted in the pipe line 15 to prevent reverse flow of the oil.

The casing 12 is provided with a by-pass opening 26 which is connected to a pipe 27 leading to the reservoir 7. The opening 26 is controlled by a valve 28 which is arranged to open the by-pass whenever the rate of flow through the inlet 11 drops below a predetermined amount. In order to obtain this result, I preferably actuate the valve by means of a pressure responsive device, such as a piston 29 slidable within the casing. In the embodiment illustrated, the piston 29 is coaxial with the valve 28, and these parts are formed integral with each other. A screw plug 30 above the piston facilitates the manufacture and assembly of the device. The piston is arranged to be subjected to an effective fluid pressure which is a function of the rate of flow through the inlet 11. This is preferably accomplished by the provision of a partition 31 formed in the casing 12 between the chamber 32 adjacent to the inlet 11 and the chamber 33 beneath the piston and adjacent to the outlet 14. An orifice or restricted opening 34 is provided in this partition, and a passage 35 connects the chamber 32 with the space 36 above the piston 29, so that the piston is exposed on its upper side to the pressure anterior to the orifice. Both the by-pass 26 and the discharge opening 14 connect directly with chamber 33. Chambers 32 and 33 form a main conduit for the flow of fluid between the inlet 11 and the discharge 14, and the partition 31 is located across the conduit anterior to the by-pass opening 26.

So long as fluid is being discharged by the pump, the pressure in chamber 32 and space 36 will exceed that in chamber 33 because of the drop through the orifice 34, and as a result the piston 29 will tend to hold valve 28 closed. This pressure drop will decrease as the rate of flow decreases, and under static conditions no pressure difference will exist. In order to open valve 28 and relieve the motor whenever the rate of flow has decreased to a predetermined amount, I provide a compression spring 38 beneath the piston 29. This spring serves to bias the valve toward open position and is of such proportions that it cannot overcome the pressure difference on the piston 29 so long as fluid is flowing through the inlet 11 at the normal rate, but whenever for any reason the flow decreases to a predetermined amount, the spring will serve to raise the piston and open the by-pass valve 28, thus permitting the pump discharge to flow back to the reservoir 7.

The operation of the invention will now be apparent from the above disclosure. Assume the pump 6 is idle, the valve 16 is in the position shown and the oil in pipes 15 and 18 is under pressure because of a load on the piston rod 22. Under these conditions spring 38 will hold valve 28 open, and check valve 24 will prevent flow of oil from cylinder 19. The motor 5 may now be started, and as it comes up to speed the discharge of the pump will flow freely through pipe 10, orifice 34, by-pass opening 26, and pipe 27 back to the reservoir 7. During the acceleration period there will be very little load on the motor. As the motor approaches its normal running speed the pressure drop due to the orifice 34 will reach a value sufficient to cause downward movement of piston 29 and closure of valve 28. This will throw the load on to the motor, and oil will be forced through check valve 24 and into cylinder 19, thereby raising piston 20. If the load on the piston rod 22 should become so great as to slow down the motor an appreciable amount, the resulting decrease in flow through orifice 34 will reduce the effective pressure on piston 29, and spring 38 will open valve 28, thus relieving the motor and preventing it from stalling or overheating. The momentum of the motor is preserved, and as it comes up to maximum speed valve 28 will automatically close and give it the load again. A peak load which would normally stall the motor can be handled by this intermittent action. If the supply of electric current to the motor should be cut off while it is under load, the valve 28 will immediately open and permit the motor to coast to a gradual stop, thus preventing the shock which would otherwise occur to the coupling and other rotating parts. The piston 20 can be lowered by rotating valve 16 one-quarter turn in a clockwise direction, whereby oil will flow from cylinder 19 back to reservoir 7. Under these conditions pipe 15 is closed off, and valve 28 will open to permit the by-passing of the pump discharge.

Having thus described my invention, what I claim as new and desire to secure by Letters Patent is:

1. An automatic control mechanism for a fluid pressure system comprising a conduit through which fluid may flow, means forming a by-pass opening in the conduit, a valve arranged to open and close the opening, a partition across the conduit anterior to the opening and having an orifice therein, and means responsive to the difference in pressure on opposite sides of the partition which serves to close the valve automatically whenever the rate of flow through the orifice exceeds a predetermined amount.

2. An automatic control mechanism for a fluid pressure system comprising a conduit through which fluid may flow, means forming a by-pass opening in the conduit, a valve arranged to open and close the opening which is biased towards an open position, a partition across the conduit anterior to the opening and having an orifice therein, and a movable pressure responsive device exposed on one side to the fluid pressure on one side of the partition and on the other side to the fluid pressure on the other side of the partition, said device being connected to close the valve against its bias when the difference between the fluid pressures on opposite sides of the partition exceeds a predetermined amount.

3. An automatic control mechanism comprising a casing having an inlet and an outlet, a partition having an orifice therein located between the inlet and outlet and arranged to form two chambers adjacent to the inlet and outlet respectively, means forming a by-pass opening leading from the outlet chamber, a valve arranged to open and close the by-pass opening, said valve being biased toward an open position, and a pressure responsive device arranged to hold the valve closed against its bias so long as the difference between the pressures in the inlet and outlet chambers exceeds a predetermined amount.

4. An automatic control mechanism comprising a casing having an inlet and an outlet, a partition having an orifice therein located between the inlet and outlet and arranged to form two chambers adjacent to the inlet and outlet respectively, means forming a by-pass opening leading from the outlet chamber, a valve arranged to open and close the by-pass opening, a spring arranged to exert a force tending to open the valve, a piston slidable in the casing and connected to the valve, and means to transmit the pressures in the two chambers to opposite sides of the piston, whereby a decrease beyond a predetermined minimum in the fluid flow through the orifice will cause the valve to open.

5. An automatic control mechanism comprising a casing having an inlet and an outlet, a partition having an orifice therein located between the inlet and outlet and arranged to form two chambers with which the inlet and outlet communicate respectively, means forming a by-pass opening leading from the outlet chamber, a valve arranged to open and close the by-pass opening, a piston slidable within the casing, said piston and valve being co-axial and integral with each other, a spring co-axial with the piston and serving to bias the valve toward open position, and means to transmit the fluid pressures in the two chambers to opposite sides of the piston, whereby a decrease beyond a predetermined minimum in the fluid flow through the orifice will cause the valve to open.

6. An automatic control mechanism comprising a hollow casing having an inlet opening, an outlet opening and a by-pass opening, the casing being shaped to provide an outlet chamber with which both the outlet opening and the by-pass opening communicate directly, a valve to control the flow through the by-pass opening, the valve being biased toward open position, a passage leading from the inlet opening to the outlet chamber and provided with a restriction, and means to close the valve automatically in opposition to its bias whenever the fluid pressure differential on opposite sides of the restriction exceeds a predetermined amount.

7. An automatic control mechanism comprising a hollow casing having an inlet opening, an outlet opening and a by-pass opening, the casing being shaped to provide an outlet chamber with which both the outlet opening and the by-pass opening communicate directly, a valve to control the flow through the by-pass opening, a movable pressure responsive device connected to the valve, and means to conduct fluid from the inlet opening to the outlet chamber and to subject the pressure responsive device to a pressure differential which is a function of the rate of flow through the inlet opening, the parts being so arranged that the valve will close automatically whenever the said rate of flow exceeds a predetermined amount.

8. An automatic control mechanism comprising a hollow casing having an inlet opening, an outlet opening and a by-pass opening, the casing being shaped to provide an outlet chamber with which both the outlet opening and the by-pass opening communicate directly, a passage leading from the inlet opening to the outlet chamber and provided with a restriction, a valve to control the flow through the by-pass opening, the valve being biased toward open position, and a movable pressure responsive device supported in the casing and connected to the valve, the pressure responsive device being exposed on one side to the pressure anterior to the restriction and on the other side to the pressure in the outlet chamber, and the parts being so arranged that the valve will be closed in opposition to its bias whenever the fluid pressure differential acting on the pressure responsive device exceeds a predetermined amount.

9. An automatic control mechanism comprising a hollow casing having an inlet opening, an outlet opening and a by-pass opening, the casing being shaped to provide an outlet chamber with which both the outlet opening and the by-pass opening communicate directly, a passage leading from the inlet opening to the outlet chamber and provided with a restriction, a valve to control the flow through the by-pass opening, the valve being biased toward open position, and a piston slidably supported in the casing and connected to the valve, the piston being exposed on one side to the pressure anterior to the restriction and on the other side to the pressure in the outlet chamber, and the parts being so arranged that the valve will be closed in opposition to its bias whenever the fluid pressure differential acting on the piston exceeds a predetermined amount.

10. An automatic control mechanism comprising a hollow casing having an inlet opening, an outlet opening and a by-pass opening, the casing being shaped to provide an outlet chamber with which both the outlet opening and the by-pass opening communicate directly, a piston slidably supported in the casing and forming the upper wall of the outlet chamber, a valve connected to the lower side of the piston and arranged to close the by-pass opening when the piston is in its lowermost position, a spring urging the valve and piston upwardly, and a passage leading from the inlet opening to the outlet chamber and provided with a restriction, the piston being exposed on its upper side to the pressure anterior to the restriction, and the parts being so arranged that the piston will close the valve against the force of the spring whenever the flow through the inlet opening exceeds a predetermined amount.

PAUL C. TEMPLE.